Figure 3:
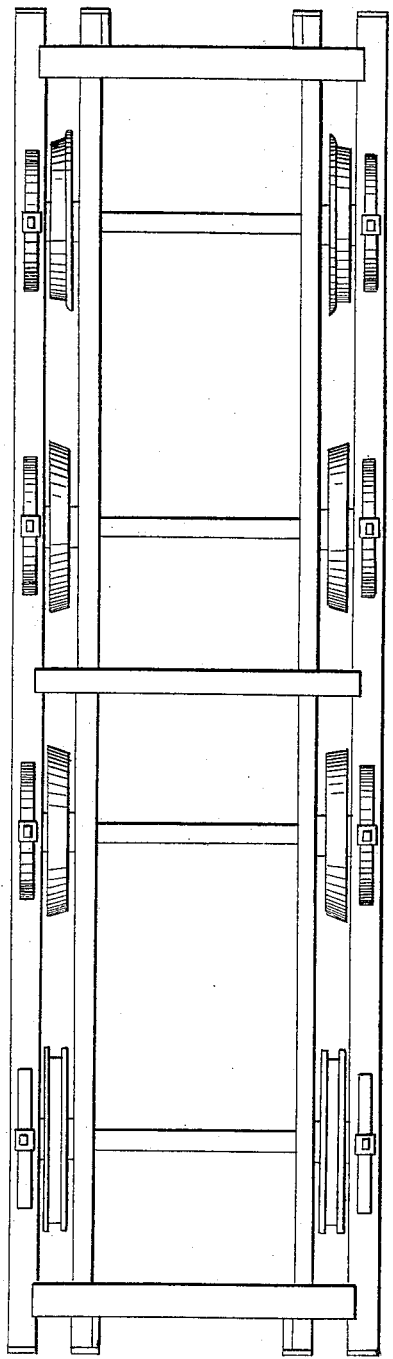

I. KNIGHT.
Car Truck.
No. 5,493.
2 Sheets—Sheet 1.
Patented Mar. 28, 1848.
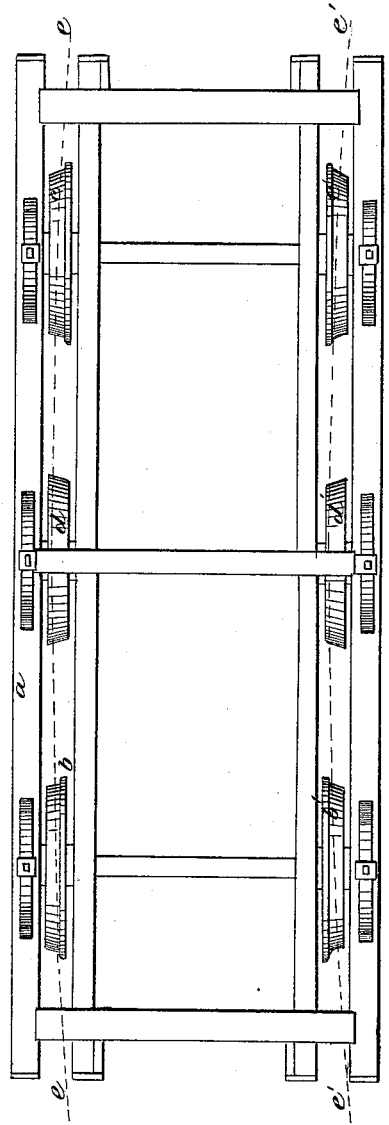
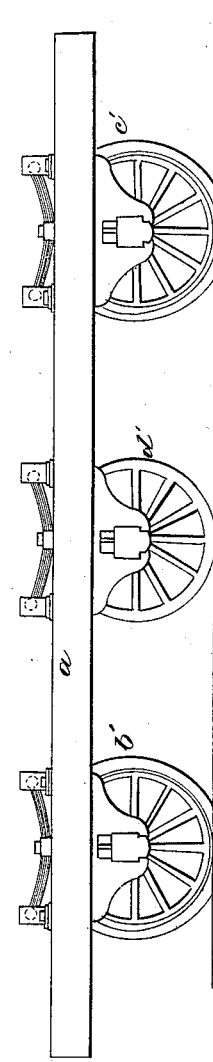

I. KNIGHT.
Car Truck.

No. 5,493.

2 Sheets—Sheet 2.

Patented Mar. 28, 1848.

UNITED STATES PATENT OFFICE.

ISAAC KNIGHT, OF BALTIMORE, MARYLAND.

RUNNING-GEAR OF RAILROAD-CARS.

Specification of Letters Patent No. 5,493, dated March 28, 1848.

*To all whom it may concern:*

Be it known that I, ISAAC KNIGHT, of the city of Baltimore and State of Maryland, have invented a new and useful Improvement in Running-Gear of Railroad Cars and Trucks, and that the following is a full, clear, and exact description of the principle or character which distinguishes it from all other things before known and of the manner of making, constructing, and using the same, reference being had to the accompanying drawings, making part of this specification, in which—

Figure 1 is a plan of the running gear of a rail road car on my improved principle, and Fig. 2, an elevation thereof.

The same letters indicate like parts in all the figures.

In the manner now practiced of constructing trucks and cars for the transportation of burdens &c. upon rail roads much power is lost in passing around curves, in consequence of the flanch of one of the forward wheels impinging against the side of the outer rail, and that of the rear wheel on the opposite side bearing against the inner rail. This is due to the tendency which the car or truck has to run in a straight line.

The object of my invention is to avoid as much as possible this defect, and save the power thus lost, and at the same time to avoid much of the tendency to run off the track. And the nature of my invention for the accomplishment of these important ends, consists of the employment, between the two sets of flanched wheels, of a set or sets of wheels the treads of which are frustums of cones reversed, that is, the larger diameter being placed on the outside so that when the truck or car runs on a curve, the curvature of the rails will cause the outer wheel or wheels to mount the rail, while the inner intermediate wheel or wheels descends on the inner rail, that is to say, the intermediate wheel or wheels will run with a greater diameter on the outer than on the inner rail in proportion to the curvature of the road, and as these intermediate wheels are fixed on their axle or axles their conical action will constantly tend to turn the truck or car in the direction of the curve, and thus relieve the flanches from the rail.

In the accompanying drawings $(a)$ represents a truck with two sets of flanched wheels $(b, b^1)$ and $(c, c^1)$ of the usual form as this makes no part of my invention; and midway between these two sets of wheels there is another set of wheels $(d, d^1)$ attached to and turning with the axle in the usual manner of rail road wheels, but the treads of these wheels are frustums of cones with the greater diameter outside, and without flanches.

In Fig. 1 the two red lines $(e, e^1)$ represent the rails of a curved track from which it will be seen that the base of the cone of the outer wheel $(d)$ is nearer the rail than that of the inner wheel $(d^1)$ and that as the bearing part of the treads of these two wheels are of different diameters the axle to which these two wheels are attached if permitted to run freely would follow the curve of the track by reason of the conical action of the treads of these two wheels, which, when thus placed are of different diameters, hence it follows that the tendency of this action, when the axle of these wheels is connected with the truck or car is to carry the truck in the direction of the curve of the road and therefore to relieve the flanches of the front and rear wheels from that heavy friction against the sides of the track which takes place in the mode of constructing cars now practiced. The angle of the cone of the conical treads of the intermediate directing wheels should be proportioned as is well known to engineers to the curves and the width of the track, and I prefer to make them cylindrical or partly so for a short distance from the inner edge to admit of the usual play when running on a straight track.

The forward and rear wheels, or either, may if desired be made with double flanches to embrace the rails. If desired the car may be made with eight wheels as represented in Fig. 3 which is a plan view of the running gear of such a car, or instead of two sets of intermediate wheels one set only may be used to make a six wheeled car; in short any modification of this kind may be made in the number of intermediate supporting and directing wheels, so long as the character of my invention is retained.

I do not claim as my invention simply the employment of intermediate supporting wheels, as this has long since been suggested; but What I do claim as my invention and desire to secure by Letters Patent is—

The employment of intermediate directing wheels the treads of which are conical with the larger diameter outside, substantially as described, when this is combined with the forward and rear wheels of a truck or car, for the purpose and in the manner substantially as described.

ISAAC KNIGHT.

Witnesses:
ALEXR. P. BROWNE,
J. J. GREENOUGH.